Patented Oct. 14, 1952

2,614,117

UNITED STATES PATENT OFFICE 2,614,117

STABILIZATION OF MONOMERIC
1,1-DICYANO ETHYLENE

Harry Gilbert and Alan E. Ardis, Cuyahoga Falls, Ohio, assignors to The B. F. Goodrich Company, New York, N. Y., a corporation of New York No Drawing. Application March 4, 1949,
Serial No. 79,714

5 Claims. (Cl. 260—465.8)

This invention relates to the stabilization of monomeric 1,1-dicyano ethylene and pertains more particularly to the use of certain compounds of the benzene series containing nitro and hydroxyl substituents for inhibiting the polymerization of monomeric 1,1-dicyano ethylene.

In copending applications, Serial Nos. 775,149, filed September 19, 1947, now abandoned, 785-520, filed November 12, 1947, now Patent No. 2,476,270 and 6,999, filed February 7, 1948, now Patent No. 2,510,491, methods for the preparation of 1,1-dicyano ethylene are disclosed. It is also disclosed in said copending applications that monomeric 1,1-dicyano ethylene polymerizes readily, especially if impurities, and particularly water, are present in the monomer. Accordingly, it is desirable that special precautions be taken during the preparation and storage of 1,1-dicyano ethylene in order to insure highest yields of monomer and to keep it in the monomeric form during periods of storage, the use of a stabilizer being especially desirable when the monomer contains impurities. Many of the most commonly used stabilizing substances, such as copper, copper salts, phenyl-beta-naphthylamine, 1,4-naphthoquinone, p-nitrosodiphenylamine and the like have been found to be unsatisfactory for inhibiting the polymerization of 1,1-dicyano ethylene, and in fact, many of these materials catalyze the polymerization of the monomer.

We have now discovered, however, that certain phenolic and nitro compounds are excellent stabilizers for monomeric 1,1-dicyano ethylene. These compounds possess the structure $Ar(X)_n$, wherein Ar is a hydrocarbon radical derived by removing hydrogen from a hydrocarbon of the benzene series (that is, benzene and homologs of benzene such as toluene, xylenes, and the like, of the general formula $C_nH_{2n-6}$) having its connecting valences on nuclear carbon atoms, X is a radical selected from the class consisting of OH and $NO_2$, and $n$ is an integer from 3 to 6. Included within this class of compounds are pyrogallol (1,2,3 trihydroxy benzene), 1,2,4-trihydroxy benzene, phloro-glucinol (1,3,5-trihydroxy benzene), 1,2,3,5-tetrahydroxy benzene, hexahydroxy benzene, 1,2,3-trinitro benzene, 1,2,4-trinitro benzene, 1,3,5-trinitro benzene, 2,3-dinitro phenol, 2,4-dinitro phenol, 2,6-dinitro phenol, 3,4-dinitro phenol, 3,5-dinitro phenol, 2,3,6-trinitro phenol, 2,4,5-trinitro phenol, picric acid (2,4,6 - trinitro phenol), 3,4,5 - trihydroxy toluene, 2,3,4-trinitro toluene, 2,4,5-trinitrotoluene, 2,4,6-trinitro cresol and the like. Pyrogallol, picric acid and trinitrobenzene are the preferred stabilizers of the above compounds, although the other compounds within the class are also excellent stabilizers for monomeric 1,1-dicyano ethylene, and are included within the scope of the invention. It is to be understood that the stabilizing effect of the above-listed compounds occurs regardless of the method of preparation of the 1,1-dicyano ethylene.

The stabilizer may be present in any desired amount, although generally, and especially for the preferred stabilizers listed hereinabove, from .1% to 10% of stabilizer, based on the weight of the monomer, is sufficient to inhibit the polymerization of monomeric 1,1-dicyano ethylene for long periods of time.

The following examples illustrate the use of compounds of the structure $Ar(X)_n$ as stabilizers for monomeric 1,1-dicyano ethylene according to this invention:

Example I

A composition comprising an impure sample of monomeric 1,1-dicyano ethylene containing 1% by weight of pyrogallol is stored in a silica glass container at a temperature of 20° C. The composition is observed constantly until the 1,1-dicyano ethylene darkens and polymerizes to a non-flowing material, which in this case requires 220 minutes. A control sample of 1,1-dicyano ethylene of the same degree of purity polymerizes to a solid material in only 55 minutes, even when maintained at a temperature of 0° C.

Example II

A composition comprising a crude sample of monomeric 1,1-dicyano ethylene containing 10% by weight of trinitro benzene is stored in a glass container maintained at a temperature of 80° C. The time required for the sample to darken and polymerize to a non-flowing gel is 405 minutes, while another portion of the same sample, containing no stabilizer, also stored at 80° C., polymerizes to a solid material in only 17 minutes.

Example III

Example II is repeated utilizing substantially anhydrous picric acid as the stabilizer. 114 minutes are required for the 1,1-dicyano ethylene to darken and polymerize to a non-flowing gel.

When the above examples are repeated utilizing other of the stabilizers disclosed hereinabove, the stabilizing effects on monomeric 1,1-dicyano ethylene are in general equal to those obtained with pyrogallol, trinitro benzene and anhydrous picric acid. Moreover, mixtures of two or more of the stabilizers listed hereinabove, such as a mixture of picric acid and trinitro benzene or mixtures of one or more of the above stabilizers with other stabilizers such as the oxides and sulfides of phosphorous (which stabilizers are disclosed in a copending application Serial No. 775,150 filed September 19, 1947) are also very effective. For example, a mixture of phosphorous pentoxide and picric acid has been found to stabilize a relatively impure sample of monomeric 1,1-dicyano ethylene for 3450 minutes while a control sample polymerizes to a non-flowing gel in only 55 minutes.

The stabilized composition may also be stored in plastic, metal or other type containers in addition to glass containers, and may be stored at temperatures even in excess of 80° C. with but little decrease in the time the composition remains stable.

While certain preferred manners of performing the invention have been disclosed, it is not intended to limit the invention thereto, for numerous variations and modifications will be apparent to those skilled in the art and are included within the scope of the invention as defined in the appended claims.

We claim:

1. A composition comprising 1,1-dicyano ethylene stabilized with pyrogallol.

2. A composition comprising 1,1-dicyano ethylene stabilized with trinitro benzene.

3. A composition comprising 1,1-dicyano ethylene stabilized with picric acid.

4. A composition comprising 1,1-dicyano ethylene stabilized with a compound selected from the class consisting of pyrogallol, picric acid and trinitro benzene.

5. A composition comprising 1,1-dicyano ethylene stabilized with from 0.1% to 10% by weight of a compound selected from the class consisting of pyrogallol, picric acid and trinitro benzene.

HARRY GILBERT.
ALAN E. ARDIS.

REFERENCES CITED

The following references are of record in the file of this patent:

UNITED STATES PATENTS

| Number | Name | Date |
| --- | --- | --- |
| 2,125,685 | Nicodemus et al. | Aug. 2, 1938 |
| 2,232,785 | Howk | Feb. 25, 1941 |
| 2,467,378 | Gilbert | Apr. 19, 1949 |
| 2,476,270 | Ardis | July 19, 1949 |

OTHER REFERENCES

Ostling: Chem. Abst., vol. 15, p. 2829 (1921).
Frank et al.: J. Am. Chem. Soc., vol. 68, p. 908 (1946).